(12) United States Patent
Kawanishi et al.

(10) Patent No.: US 10,326,925 B2
(45) Date of Patent: Jun. 18, 2019

(54) CONTROL APPARATUS FOR PERFORMING FOCUS DETECTION, IMAGE CAPTURING APPARATUS, CONTROL METHOD, AND NON-TRANSITORY COMPUTER-READABLE STORAGE MEDIUM

(71) Applicant: CANON KABUSHIKI KAISHA, Tokyo (JP)

(72) Inventors: Atsuya Kawanishi, Kawasaki (JP); Yohei Matsui, Tokyo (JP); Naoki Iwasaki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/668,877

(22) Filed: Aug. 4, 2017

(65) Prior Publication Data

US 2018/0048805 A1    Feb. 15, 2018

(30) Foreign Application Priority Data

Aug. 10, 2016  (JP) .................................. 2016-157102
Jun. 14, 2017  (JP) .................................. 2017-116352

(51) Int. Cl.
    *H04N 5/232*    (2006.01)

(52) U.S. Cl.
    CPC ..... *H04N 5/23212* (2013.01); *H04N 5/23245* (2013.01)

(58) Field of Classification Search
    CPC ........................ H04N 5/23212; H04N 5/23245
    See application file for complete search history.

(56) References Cited

U.S. PATENT DOCUMENTS

| 5,083,150 A * | 1/1992 | Nagasaki ............... G02B 7/365 348/356 |
| 7,693,410 B2 | 4/2010 | Kawanishi |
| 7,920,781 B2 | 4/2011 | Onuki |
| 2003/0020825 A1* | 1/2003 | Higuma .................. G02B 7/08 348/354 |
| 2011/0164865 A1* | 7/2011 | Hamada ................ G02B 7/365 396/91 |
| 2011/0236007 A1* | 9/2011 | Park ........................ G02B 7/36 396/128 |
| 2013/0329118 A1* | 12/2013 | Hongu ............... H04N 5/23209 348/345 |
| 2014/0204231 A1* | 7/2014 | Takahara ................ G02B 7/34 348/220.1 |

(Continued)

FOREIGN PATENT DOCUMENTS

| EP | 1085751 A2 | 3/2001 |
| JP | 2001-083407 A | 3/2001 |
| JP | 2009-003122 A | 1/2009 |

*Primary Examiner* — Lin Ye
*Assistant Examiner* — John H. Moorehead, III
(74) *Attorney, Agent, or Firm* — Venable LLP

(57) ABSTRACT

A control apparatus (204, 212) includes a calculator (204) that calculates a defocus amount based on a first signal and a second signal that correspond to light beams passing through different pupil regions of an image capturing optical system (101, 102, 103) from each other, and a focus adjuster (212) that performs focus adjusting operation based on the defocus amount, and the focus adjuster is configured to change a detection property of the first signal and the second signal depending on a type of the focus adjusting operation.

11 Claims, 11 Drawing Sheets

(56) References Cited

U.S. PATENT DOCUMENTS

| | | | | |
|---|---|---|---|---|
| 2015/0009383 A1* | 1/2015 | Fujii | ............... | H04N 5/347 |
| | | | | 348/302 |
| 2015/0195446 A1* | 7/2015 | Saito | ............ | H04N 5/23219 |
| | | | | 348/353 |
| 2015/0256737 A1* | 9/2015 | Saito | ............ | H04N 5/23212 |
| | | | | 348/349 |
| 2015/0316833 A1* | 11/2015 | Watanabe | ............ | G02B 7/28 |
| | | | | 348/345 |
| 2016/0105600 A1* | 4/2016 | Omata | ............ | G02B 7/34 |
| | | | | 348/140 |
| 2016/0127637 A1* | 5/2016 | Takao | ............ | G02B 7/365 |
| | | | | 348/208.12 |

* cited by examiner

PIXEL CONFIGURATION OF NON-IMAGING-PLANE PHASE DIFFERENCE METHOD

| R | Gr | R | Gr | R | Gr | R | Gr | R | Gr |
|---|----|---|----|---|----|---|----|---|----|
| Gb | B | Gb | B | Gb | B | Gb | B | Gb | B |

PIXEL CONFIGURATION OF IMAGING-PLANE PHASE DIFFERENCE METHOD

| R | R | Gr | Gr | R | R | Gr | Gr | R | R | Gr | Gr | R | R | Gr | Gr | R | R | Gr | Gr |
|---|---|----|----|---|---|----|----|---|---|----|----|---|---|----|----|---|---|----|----|
| A | B | A  | B  | A | B | A  | B  | A | B | A  | B  | A | B | A  | B  | A | B | A  | B  |
| Gb | Gb | B | B | Gb | Gb | B | B | Gb | Gb | B | B | Gb | Gb | B | B | Gb | Gb | B | B |
| A | B | A | B | A | B | A | B | A | B | A | B | A | B | A | B | A | B | A | B |

| AF MODE | CONTROL STATE (DRIVE MODE) | AF OPERATION | | | |
|---|---|---|---|---|---|
| | | ONE-POINT AF | FACE AF | ZONE AF | AUTOMATIC SELECTION AF |
| ONE-SHOT AF | STOP FOCUSING | 1 POINT/HIGH+MIF+LOW | 1 POINT/HIGH+MIF+LOW | 9 POINT/HIGH+MID | 25 POINT/MID |
| | TARGET DRIVE | 1 POINT/HIGH+MIF+LOW | 1 POINT/HIGH+MIF+LOW | 9 POINT/HIGH+MID | 9 POINT/HIGH+MID |
| | DEFOCUS DRIVE | 1 POINT/HIGH+MIF+LOW | 1 POINT/HIGH+MIF+LOW | 9 POINT/MID+LOW | 9 POINT/MID+LOW |
| | SEARCH DRIVE | 1 POINT/HIGH+MIF+LOW | 1 POINT/HIGH+MIF+LOW | 9 POINT/MID+LOW | 25 POINT/LOW |
| SERVO AF | STOP FOCUSING | 1 POINT/HIGH+MIF+LOW | 9 POINT/HIGH+MID | 9 POINT/HIGH+MID | 9 POINT/HIGH+MID |
| | TARGET DRIVE | 1 POINT/HIGH+MIF+LOW | 9 POINT/HIGH+MID | 9 POINT/HIGH+MID | 9 POINT/HIGH+MID |
| | DEFOCUS DRIVE | 1 POINT/HIGH+MIF+LOW | 9 POINT/MID+LOW | 9 POINT/MID+LOW | 9 POINT/MID+LOW |
| | SEARCH DRIVE | 1 POINT/HIGH+MIF+LOW | 9 POINT/MID+LOW | 9 POINT/MID+LOW | 9 POINT/MID+LOW |
| CONTI-NUOUS AF | STOP FOCUSING | 1 POINT/HIGH+MIF+LOW | 9 POINT/HIGH+MID | 9 POINT/HIGH+MID | 9 POINT/HIGH+MID |
| | TARGET DRIVE | 1 POINT/HIGH+MIF+LOW | 9 POINT/HIGH+MID | 9 POINT/HIGH+MID | 9 POINT/HIGH+MID |
| | DEFOCUS DRIVE | 1 POINT/HIGH+MIF+LOW | 9 POINT/MID+LOW | 9 POINT/MID+LOW | 9 POINT/MID+LOW |
| | SEARCH DRIVE | 1 POINT/HIGH+MIF+LOW | 9 POINT/MID+LOW | 9 POINT/MID+LOW | 9 POINT/MID+LOW |

FIG. 5

CONTROL APPARATUS FOR PERFORMING FOCUS DETECTION, IMAGE CAPTURING APPARATUS, CONTROL METHOD, AND NON-TRANSITORY COMPUTER-READABLE STORAGE MEDIUM

BACKGROUND OF THE INVENTION

Field of the Invention

The present invention relates to an image capturing apparatus that performs focus detection.

Description of the Related Art

In recent years, as a phase difference AF (imaging-plane phase difference AF) using an image sensor, a method of acquiring a captured image using pixels of the image sensor and performing focus detection is proposed. According to the imaging-plane phase difference AF, object detection and focus adjustment can be performed based on signals obtained from the same image sensor, and as a result it is possible to perform high-speed and high-accuracy focus adjustment.

Japanese Patent Laid-open No. 2001-083407 discloses a configuration where a plurality of photodiodes corresponding to one microlens are provided and each photodiode receives light of different pupil planes of an imaging lens. With such a configuration, it is possible to compare outputs of the two photodiodes to perform the imaging-plane phase difference AF.

Japanese Patent Laid-open No. 2009-003122 discloses a configuration where a sensitivity region of a light receiving portion is eccentric with respect to an optical axis of an on-chip microlens in a part of pixels of an image sensor to provide a pupil division function. By using these pixels as focus detection pixels and arranging the focus detection pixels at a predetermined interval between imaging pixels, the imaging-plane phase difference AF can be performed. Since the arrangement position of the focus detection pixel corresponds to a defect portion of the imaging pixel, image information is generated by interpolation from the information of peripheral imaging pixels. With such a configuration, it is possible to perform phase difference detection on the imaging plane, and as a result high-speed and high-accuracy focus adjustment can be performed even in a case of electronic finder observation or moving image capturing.

However, in reality, a detection property greatly varies depending on an evaluation band of a signal waveform used for correlation calculation. Furthermore, in the imaging-plane phase difference AF, since the correlation calculation needs to be performed in synchronization with the imaging signal, a permissible correlation calculation time for one image is limited. For this reason, in a direction detection operation in a state of a large blur, a detection range is widened by using a signal where a low-pass filter is applied, while it is necessary to improve a detection accuracy by using a signal where a high-pass filter is applied in a focus operation near an in-focus state. That is, appropriate detection property for stably performing high-speed and high-accuracy focus adjustment varies depending on a state of the focus adjustment operation.

BRIEF SUMMARY OF THE INVENTION

The present invention provides a control apparatus, an image capturing apparatus, a control method, and a non-transitory computer-readable storage medium that can stably perform high-speed and high-accuracy focus adjustment.

A control apparatus as one aspect of the present invention includes a calculator configured to calculate a defocus amount based on a first signal and a second signal that correspond to light beams passing through different pupil regions of an image capturing optical system from each other, and a focus adjuster configured to perform focus adjusting operation based on the defocus amount, and the focus adjuster is configured to change a detection property of the first signal and the second signal depending on a type of the focus adjusting operation.

An image capturing apparatus as another aspect of the present invention includes an image sensor including a first photoelectric converter and a second photoelectric converter configured to receive light beams passing through different pupil regions of an image capturing optical system from each other, a calculator configured to calculate a defocus amount based on a first signal and a second signal that correspond to output signals from the first photoelectric converter and the second photoelectric converter, respectively, and a focus adjuster configured to perform focus adjusting operation based on the defocus amount, and the focus adjuster is configured to change a detection property of the first signal and the second signal by the calculator depending on a type of the focus adjusting operation.

A control method as another aspect of the present invention includes the steps of calculating a defocus amount based on a first signal and a second signal that correspond to light beams passing through different pupil regions of an image capturing optical system from each other, and performing focus adjusting operation based on the defocus amount, and the step of performing the focus adjusting operation includes changing a detection property of the first signal and the second signal by the calculator depending on a type of the focus adjusting operation.

A non-transitory computer-readable storage medium as another aspect of the present invention stores a program which causes a computer to execute the control method.

Further features of the present invention will become apparent from the following description of exemplary embodiments with reference to the attached drawings.

BRIEF DESCRIPTION OF THE DRAWINGS

FIG. 5 is an explanatory diagram related to detection property setting in each embodiment.

DESCRIPTION OF THE EMBODIMENTS

Exemplary embodiments of the present invention will be described below with reference to the accompanied drawings.

First Embodiment

Figure 1:
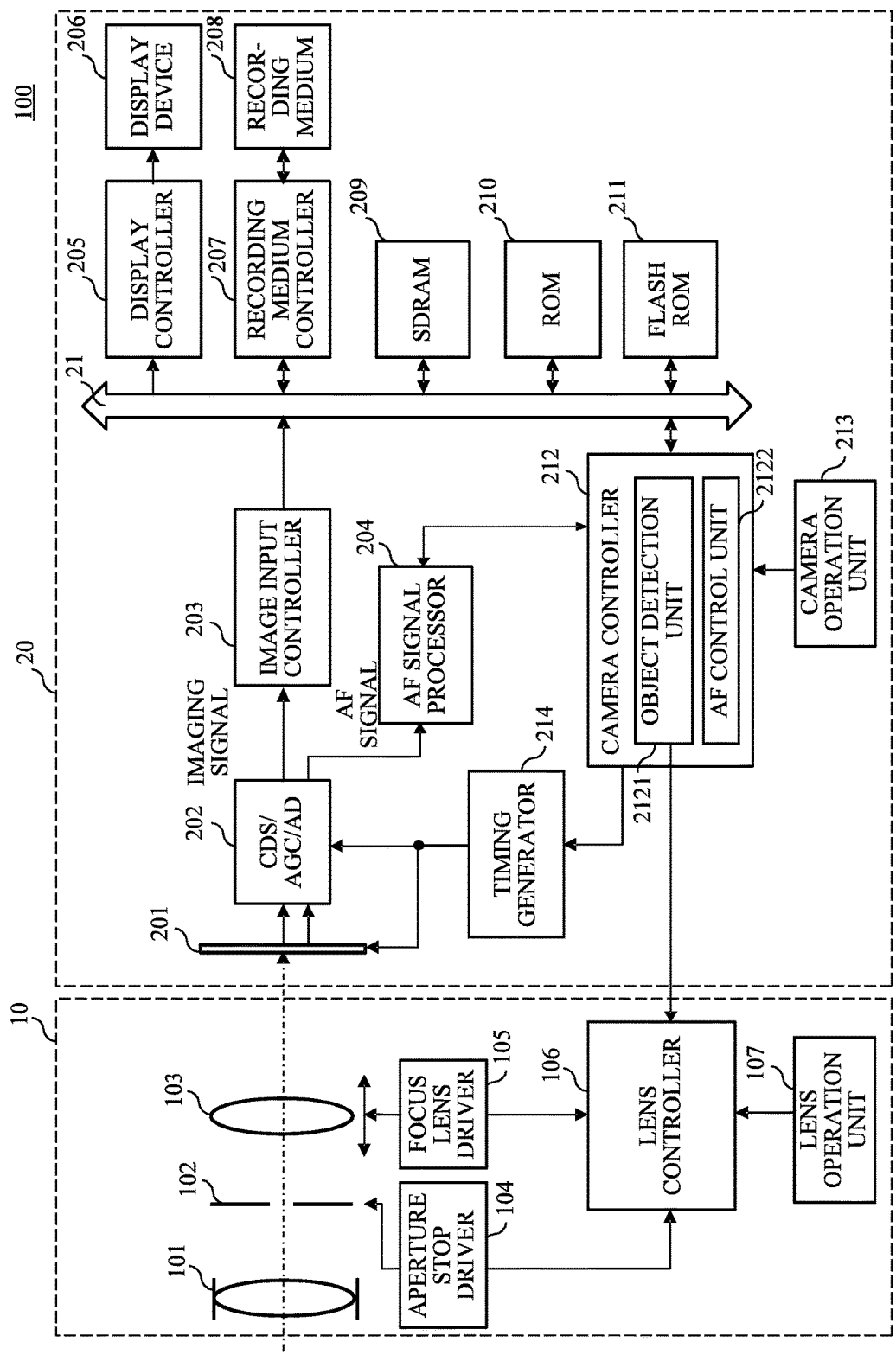
FIG. 1 is a block diagram of an image capturing apparatus in each embodiment.

First, referring to FIG. 1, a configuration of an image capturing apparatus in a first embodiment of the present invention will be described. FIG. 1 is a block diagram of an image capturing apparatus 100 (lens interchangeable camera system) in this embodiment. The image capturing apparatus 100 includes a camera body 20 (image capturing apparatus body) and a lens unit 10 (interchangeable lens) detachably attached to the camera body 20. A lens controller 106 that manages control of an entire operation of the lens unit 10 and a camera controller 212 that manages control of an entire operation of the image capturing apparatus 100 (camera system) including the lens unit 10 are communicated to each other via a terminal (not illustrated) provided in a lens mount. This embodiment can also be applied to an image capturing apparatus where a lens unit and a camera body are integrated.

First, the configuration of the lens unit 10 will be described. A fixed lens 101, an aperture stop 102, and a focus lens 103 constitute an image capturing optical system. The aperture stop 102 is driven by an aperture stop driver 104 and it controls an amount of light incident on an image sensor 201 described below. The focus lens 103 is driven by a focus lens driver 105, and an in-focus distance of the image capturing optical system changes depending on a position of the focus lens 103. The aperture stop driver 104 and the focus lens driver 105 are controlled by a lens controller 106, and they determine an opening amount of the aperture stop 102 and the position of the focus lens 103, respectively.

A lens operation unit 107 is an input device unit for performing settings relating to the operation of the lens unit 10 by a user, such as switching of AF (auto focus)/MF (manual focus) mode, position adjustment of the focus lens 103 by MF, setting of a hand-shake correction mode. When the lens operation unit 107 is operated by the user, the lens controller 106 performs control according to the operation. The lens controller 106 controls the aperture stop driver 104 and the focus lens driver 105 according to a control command or control information received from a camera controller 212 described below. Furthermore, the lens controller 106 transmits lens control information to the camera controller 212.

Next, a configuration of the camera body 20 will be described. The camera body 20 is configured to acquire an image capturing signal from a light beam passing through the image capturing optical system of the lens unit 10. The image sensor 201 includes a CCD sensor, a CMOS sensor, or the like, and it photoelectrically converts an object image (optical image) formed via the image capturing optical system of the lens unit 10 to output a pixel signal (image data). That is, the light beam incident from the image capturing optical system forms an image on the light receiving surface of the image sensor 201 and it is converted into a signal charge depending on the amount of incident light by the pixels (photodiodes) arrayed in the image sensor 201. The signal charges accumulated in the respective photodiodes are sequentially read out from the image sensor 201 as voltage signals corresponding to the signal charges based on drive pulses output from a timing generator 214 in accordance with commands from the camera controller 212.

Each pixel of the image sensor 201 used in this embodiment includes two (i.e., a pair of) photodiodes A and B and one microlens provided for the pair of photodiodes A and B (i.e., sharing the photodiodes A and B). That is, the image sensor 201 includes the pair of photodiodes (first photoelectric converter and second photoelectric converter) for one microlens (i.e., for each of a plurality of microlenses), and the plurality of microlenses are arrayed in two dimensions. Each pixel divides incident light with the microlens to form a pair of optical images on the pair of photodiodes A and B, and it outputs a pair of pixel signals (image signal A and image signal B) that are used as AF signals described below from the pair of photodiodes A and B. Furthermore, by adding the outputs of the pair of photodiodes A and B, an imaging signal (image signal A+B) can be obtained.

By combining a plurality of image signals A and a plurality of image signals B respectively output from a plurality of pixels, the pair of image signals as AF signals (focus detection signals) used for AF (imaging-plane phase difference AF) by the imaging-plane phase difference detection method are obtained. An AF signal processor 204 described below performs correlation calculation on the pair of image signals to calculate a phase difference (i.e., image shift amount) as a deviation amount of the pair of image signals, and further it calculates a defocus amount (and a defocus direction) of the image capturing optical system based on the image shift amount.

As described above, the image sensor 201 photoelectrically converts the optical image formed by receiving the light beams passing through the image capturing optical system of the lens unit 10 into an electric signal to output image data (i.e., image signal). The image sensor 201 of this embodiment is provided with the two photodiodes for one microlens, and it is possible to generate the image signal used for focus detection by the imaging-plane phase difference AF method. The number of photodiodes (divided PDs) sharing one microlens may be changed, for example, by providing four photodiodes for one microlens.

Figures 2, 3A, 3B:
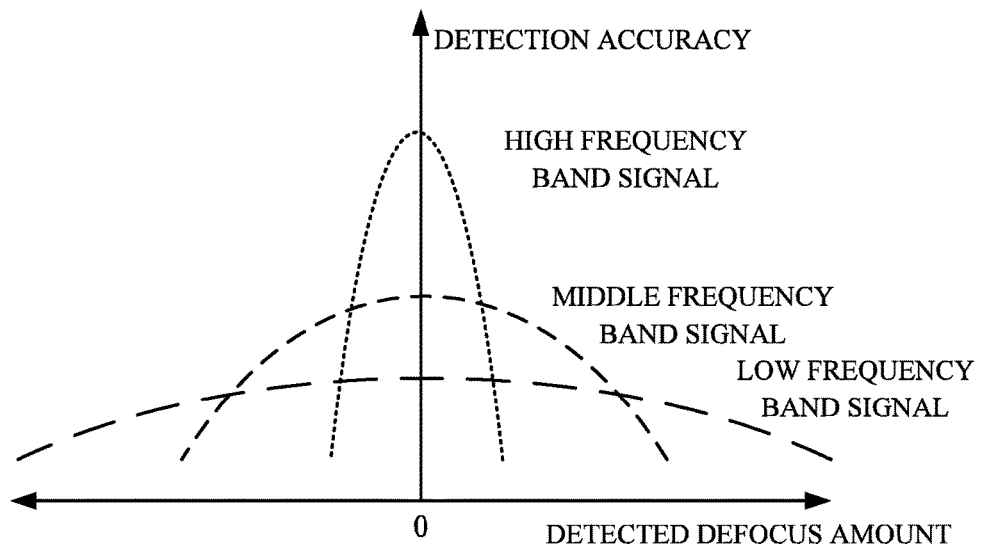
FIG. 2 is a diagram of illustrating a relationship between a detection accuracy and a detected defocus amount for each band of an AF signal.
FIGS. 3A and 3B are diagrams of illustrating pixel configuration examples of a non-imaging-plane phase difference method and an imaging-plane phase difference method, respectively.

FIG. 3A schematically illustrates a configuration example of pixels which are not adaptable to the imaging-plane phase difference AF method, and FIG. 3B schematically illustrates a configuration example of pixels which are adaptable to the imaging-plane phase difference AF method. In both the pixel configurations illustrated in FIGS. 3A and 3B, a Bayer array is used, and symbol R denotes a red color filter, symbol B denotes a blue color filter, and symbols Gr and Gb denote green color filters. In the pixel configuration of FIG. 3B which is adaptable to the imaging-plane phase difference AF, in one pixel (pixel indicated by a solid line) in the pixel configuration which is not adaptable to the imaging-plane phase difference AF method illustrated in FIG. 3A, two photodiodes A and B divided in a horizontal direction of FIG. 3B are provided. The photodiodes A and B (first photoelectric converter and second photoelectric converter) receive the light beams passing through different pupil regions of the image capturing optical system from each other. Since the photodiodes A and B receive the light beams passing through different regions of an exit pupil of the image capturing optical system, the image signal B has a parallax with respect to the image signal A. The pixel dividing method illustrated in FIG. 3B is merely an example, and other configurations such as a configuration where the pixel is divided in a vertical direction of FIG. 3B and a configuration where the pixel is divided into two in the horizontal direction and in the vertical direction (a total of four divisions) may be adopted. A plural types of pixels divided by different division methods in the same image sensor may be included.

In this embodiment, the configuration where the plurality of photoelectric converters are arranged for one microlens and pupil-divided light beams are incident on the respective photoelectric converters is described, but the present invention is not limited thereto. For example, the focus detection pixel may have a configuration where one PD is provided under the microlenses and pupil division is performed by shielding left and right or upper and lower sides with a light shielding layer. Alternatively, a configuration where a pair of focus detection pixels are discretely arranged in an array of a plurality of imaging pixels and a pair of image signals are acquired from the pair of focus detection pixels may be adopted.

A CDS/AGC/AD converter 202 performs correlated double sampling for removing a reset noise, gain adjustment, and AD conversion on the AF signal and the imaging signal read from the image sensor 201. The CDS/AGC/AD converter 202 outputs the imaging signal and the AF signal where the processing has been performed to an image input controller 203 and the AF signal processor 204, respectively.

The image input controller 203 stores, as an image signal, the imaging signal output from the CDS/AGC/AD converter 202 in an SDRAM 209 via a bus 21. The image signal stored in the SDRAM 209 is read by a display controller 205 via the bus 21 and displayed on a display device 206. In a recording mode for recording the image signal, the image signal stored in the SDRAM 209 is recorded on the recording medium 208 such as a semiconductor memory by the recording medium controller 207. A ROM 210 stores a control program and a processing program executed by the camera controller 212 (focus adjuster), various data necessary for executing these programs, and the like. A flash ROM 211 stores various setting information and the like relating to the operation of the camera body 20 set by the user.

An object detection unit 2121 of the camera controller 212 detects a specific object based on the imaging signal input from the image input controller 203 and it determines a position of the specific object in the imaging signal. Further, the object detection unit 2121 continuously inputs the imaging signal from the image input controller 203, and it determines the position of the moved object when the detected specific object moves. As described above, the object detection unit 2121 follows the position of the specific object. The specific object is, for example, a face object or an object existing at a position designated by the user in a imaging screen via the camera operation unit 213. As described below, information on the position and the size of the detected specific object is mainly used for setting an area (focus detection area) for AF.

The AF signal processor 204 (calculator) performs the correlation calculation on the pair of image signals that are AF signals output from the CDS/AGC/AD converter 202, and it calculates the image shift amount and the reliability of the pair of image signals. The reliability is calculated by using the degree of coincidence of two images (a pair of image signals) and the steepness of a correlation change amount that will be described below. Further, the AF signal processor 204 sets the position and the size of the focus detection area that is an area for performing the focus detection and AF in the imaging screen. The AF signal processor 204 outputs, to the camera controller 212, information relating to the image shift amount (detected amount) and the reliability calculated in the focus detection area. Details of the processing performed by the AF signal processor 204 will be described below.

An AF control unit 2122 in the camera controller 212 changes setting of the AF signal processor 204 as appropriate based on the image shift amount calculated by the AF signal processor 204, the reliability, and information indicating a state of the lens unit 10 and the camera body 20. For example, when the image shift amount is equal to or larger than the predetermined amount, the AF control unit 2122 sets the area for performing the correlation calculation wider than the area set by the AF signal processor 204, or it changes a type of a bandpass filter depending on a contrast of the pair of image signals. Further, in order to set the focus detection area by the AF signal processor 204, the AF control unit 2122 sends, to the AF signal processor 204, information on the specific object detected by the object detection unit 2121 or the position specified by the user via the camera operation unit 213 in the imaging screen. As a result, the AF control unit 2122 and the AF signal processor 204 can set the position and the range of the focus detection area based on these pieces of information.

In this embodiment, the camera controller 212 acquires a total of three signals of the imaging signal (image signal A+B) and the pair of image signals (image signal A and image signal B) as AF signals from the image sensor 201. However, considering a load of the image sensor 201, the camera controller 212 may be configured to take out a total of two signals, for example, the imaging signal (image signal A+B) and one AF signal (image signal A) from the image sensor 201. In this case, the camera controller 212 can calculate a difference between the taken imaging signal and the AF image signal ((image signal A+B)−(image signal A)) to be used as another AF image signal (image signal B). The imaging signal (image signal A+B) and one image signal (image signal A or image signal B) also have a parallax.

The camera controller 212 controls each unit while exchanging information with each unit in the camera body 20. In response to an input from the camera operation unit 213 based on the operation by the user, the camera controller 212 performs various processing corresponding to the operation by the user, such as turning on/off the power supply, changing various settings, imaging processing, AF processing, reproduction processing of recorded images. Further, the camera controller 212 transmits a control command to the lens unit 10 (lens controller 106) and information of the camera body 20 to the lens controller 106, and it acquires information of the lens unit 10 from the lens controller 106. The camera controller 212 includes a microcomputer and, it controls an entire camera system including the lens unit 10 by executing a computer program stored in the ROM 210. Further, the camera controller 212 calculates the defocus amount by using the image shift amount in the focus detection area calculated by the AF signal processor 204, and it controls the drive of the focus lens 103 via the lens controller 106 based on the calculated defocus amount.

Figure 4:
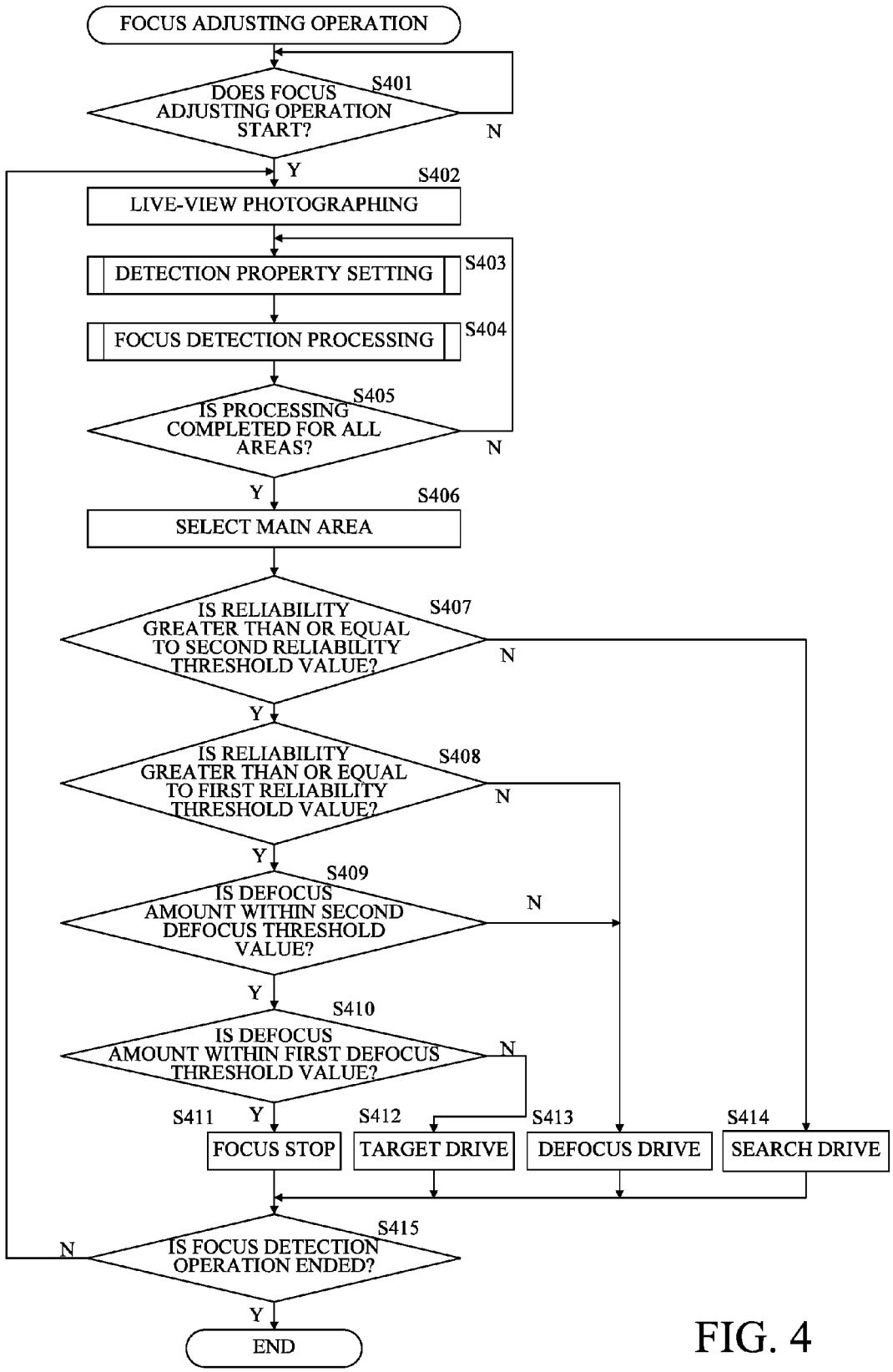
FIG. 4 is a flowchart of illustrating a focus adjustment operation in each of first and second embodiments.

Next, referring to FIG. 4, the focus adjustment operation (focus control) in this embodiment will be described. FIG. 4 is a flowchart of illustrating a procedure of the focus adjustment operation. Each step of FIG. 4 is performed by the camera controller 212 (mainly the AF control unit 2122) according to a computer program (imaging processing program).

First, at step S401, the camera controller 212 determines whether to perform the focus adjustment operation according to the setting of the camera body 20 and the input signal from the camera operation unit 213. Step S401 is repeated until the focus adjustment operation is started. When it is determined that the camera controller 212 performs the focus adjustment operation, the flow proceeds to step S402. At step S402, in order to acquire the AF signal used for the imaging-plane phase difference AF and the imaging signal used for the live-view display, the camera controller 212 performs exposure on the image sensor 201 and performs live-view image capturing.

Subsequently, at step S403, the camera controller 212 calculates an appropriate detection property (frequency band of the image signal used for the focus detection) depending on the current setting of the camera body 20 and the current control state (drive mode) of the focus adjustment operation. As illustrated in FIG. 5, for example, the camera controller 212 determines the number of the focus detection areas for simultaneously performing the focus detection and the evaluation band (frequency band of the image signal) to be used based on the combination (i.e., type of the focus adjusting operation) of the AF operation, the control state (drive mode), and the AF mode. For example, the AF operation and the AF mode are set by receiving the input by the user. As the control state, a result selected by receiving the focus detection result in the previous frame is used.

FIG. 5 is an explanatory diagram relating to detection property setting (setting of the focus detection property). In FIG. 5, the AF operation includes one-shot AF, servo AF, and continuous AF. The control state (drive mode) includes focus stop, target drive, defocus drive, and search drive. The AF mode includes one point AF, face AF, zone AF, and automatic selection AF. In FIG. 5, the number such as one point and nine points indicate the number of focus detection areas for simultaneously performing the focus detection. The evaluation band of the focus adjustment operation can be changed depending on the type of the filter applied to the image signal. In this embodiment, three bands of the high frequency band ("HIGH"), the middle frequency band ("MID"), and the low frequency band ("LOW") are set as the evaluation band.

The high frequency band, the middle frequency band, and the low frequency band are the evaluation band (frequency band) of the AF signal (signal waveform) used for the correlation calculation. Referring to FIG. 2, the properties of the high frequency band, the middle frequency band, and the low frequency band (the high frequency band signal, the middle frequency band signal, and the low frequency band signal) will be described. FIG. 2 is a diagram of illustrating a relationship between the detection accuracy for each evaluation band of the AF signal and the detected defocus amount, and the vertical axis represents the detection accuracy and the horizontal axis represents the detected defocus amount. As illustrated in FIG. 2, the high frequency band signal has a high detection accuracy, but the range of the detected defocus amount (the detectable range of the defocus amount) is narrow. For this reason, the high frequency band signal is suitably used for focusing in the vicinity of the in-focus state. On the other hand, the range of the detected defocus amount of the low frequency band signal is wide, but the detection accuracy is low. Therefore, the low frequency band signal is used suitably for the direction detection operation at the time of a large blur. The middle frequency band signal also has an intermediate property of both the high frequency band signal and the low frequency band signal.

In FIG. 5, for example, attention is paid to the case where the AF operation is one-shot AF and the AF mode is set to one point AF or face AF which performs the focus adjustment operation for a predetermined focus detection area. In this case, since the calculation target area is limited, the camera controller 212 can calculate all the evaluation bands of the high frequency band, the middle frequency band, and the low frequency band within a predetermined processing time regardless of the control state of the focus adjustment operation. On the other hand, in the case of zone AF or automatic selection AF where it is necessary to perform selection operation of the main area in parallel to the focus adjustment operation while simultaneously calculating a plurality of focus detection areas, it is difficult to calculate all the evaluation bands within the predetermined processing time. Therefore, it is necessary to effectively switch (select) the evaluation band for calculation depending on the control state.

Further, in FIG. 5, attention is paid to a case where the AF mode is set to the face AF mode. In the case of one-shot AF assuming that the object is stationary during the focus adjusting operation of the AF operation, the calculation target area can be limited. Therefore, it is possible to calculate all the evaluation bands of the high frequency band, the middle frequency band, and the low frequency band within a predetermined processing time regardless of the control state of the focus adjustment operation. On the other hand, in the case of servo AF or continuous AF assuming that the object is moving during the focus adjustment operation, it is necessary to perform the main area selection operation in parallel to the focus adjustment operation while simultaneously calculating a plurality of focus detection areas. For this reason, it is difficult to calculate all the evaluation bands within a predetermined processing time, and it is necessary to effectively switch (select) the evaluation band calculated depending on the control state.

In this embodiment, the types of the AF operation, the control state, and the AF mode are not limited thereto, and a configuration which does not include a part of them, another AF operation, control state, or AF mode may be included. Further, in this embodiment, the evaluation band is not limited to the three bands of the high frequency band, the middle frequency band, and the low frequency band, and may have two bands or four or more bands.

Subsequently, at step S404, the AF signal processor 204 performs the focus detection processing based on a command from the camera controller 212 (AF control unit 2122). The focus detection processing is processing for acquiring information on the defocus amount and the reliability (correlation reliability) for performing the imaging-plane phase difference AF. Further, the detection property set with respect to the region (focus detection region) in the imaging screen from which information is acquired in the focus detection processing are set depending on the control state of the camera body 20. Details of the focus detection processing will be described later.

Subsequently, at step S405, the camera controller 212 (AF control unit 2122) determines whether the processing at steps S403 and S404 has been performed for all the set focus detection areas. When there is a focus detection area where the processing at steps S403 and S404 is not performed, the process returns to step S403, and the AF control unit 2122 performs the processing in steps S403 and S404 with respect to the focus detection area which has not yet been performed. On the other hand, when the processes in steps S403 and S404 are performed for all the focus detection areas, the process proceeds to step S406.

At step S406, the camera controller 212 (AF control unit 2122) selects the main area (main focus detection area) that is to be targeted for the focus adjusting operation based on the reliability (correlation reliability) relating to each focus detection area calculated at step S404 and the detected defocus amount. Step S406 is required mainly when the AF mode is the zone AF or the automatic selection AF. There are various methods for selecting the main area, such as face position priority, close proximity priority, central priority, and the like, but in this embodiment, it can be selected using any method according to the application. When the AF mode is one point AF or face AF and only one focus detection area exists, the one focus detection area may be set as the main area.

Subsequently, at steps S407 to S410, drive control to be performed is selected depending on the reliability of the focus detection and the defocus amount obtained by the focus detection. The selection result is used for the detection property setting (S403) for the image acquired in the next frame. At step S407, the camera controller 212 (AF control unit 2122) determines whether the reliability of the main area selected at step S406 is equal to or greater than the second reliability threshold value. The reliability is obtained from the degree of coincidence of the two images and the steepness of the image shift amount. In this embodiment, it is preferred to set the highest value of the reliability range where the calculated defocus amount cannot be trusted as the second reliability threshold value. In this embodiment, the reliability can be obtained by using both or one (that is, at least one) of the degree of coincidence of two images and the steepness of the image shift amount. The reliability may also be obtained by using other indicators such as signal levels of the two images.

When it is determined at step S407 that the reliability is equal to or greater than the second reliability threshold value, the process proceeds to step S408, and the AF control unit 2122 determines whether the reliability is equal to or higher than the first reliability threshold value higher than the second reliability threshold value. The first reliability threshold value is determined based on the detected variation in the calculated defocus amount, and it is preferred that the maximum value in the reliability range where the focusing accuracy cannot be guaranteed is set.

When it is determined at step S408 that the reliability is equal to or higher than the first reliability threshold value, the flow proceeds to step S409. At step S409, the AF control unit 2122 determines whether the defocus amount (detected defocus amount) calculated with respect to the main region selected at step S406 is within the second defocus threshold. The second defocus threshold value is determined based on the calculated defocus amount, and it is preferred that the maximum value is set in the defocus range where the defocus amount is detectable even when the above-described evaluation band is switched to a high frequency band having a narrow detection range of the defocus amount.

When it is determined that the detected defocus amount is within the second defocus threshold value, the flow proceeds to step S410, and the AF control unit 2122 determines whether the detected defocus amount is within the first defocus threshold value smaller than the second defocus amount threshold value. The first defocus threshold value is determined based on the depth of focus and it is preferred to set the maximum value of the defocus range that can be determined as in-focus state.

When it is determined at step S410 that the detected defocus amount is within the first defocus threshold value, the flow proceeds to step S411. At step S411, the AF control unit 2122 determines that the object can be focused (in-focus state), and it stops the focus lens 103 (stop focusing). On the other hand, when it is determined that the detected defocus amount is not within the first defocus threshold value, the flow proceeds to step S412. At step S412, the AF control unit 2122 calculates a drive amount of the focus lens 103 based on the detected defocus amount and performs the target drive to intermittently drive the focus lens 103 via the focus lens driver 105. The target drive is a drive exclusively performing the focus detection processing and the focus lens control (focus lens drive) in order to enhance detection accuracy and control accuracy in the focus adjustment. That is, in the target drive, the focus detection is performed by using the image signal acquired while the focus lens is stopped.

When it is determined at step S408 that the reliability is not equal to or higher than the first reliability threshold value or when it is determined at step S409 that the detected defocus amount is not within the second defocus threshold value, the flow proceeds to step S413. At step S413, the AF control unit 2122 calculates the drive amount of the focus lens 103 based on the detected defocus amount, and it performs the defocus drive where the focus lens 103 is continuously driven via the focus lens driver 105. The defocus drive is a drive where the focus detection processing and the focus lens control (focus lens drive) are performed in parallel while giving priority to the speed compared to the accuracy. That is, in the defocus drive, the focus detection is performed by using the image signal acquired during the drive of the focus lens 103.

When it is determined at step S407 that the reliability is not equal to or greater than the second reliability threshold value, the flow proceeds to step S414. At step S414, the AF control unit 2122 calculates the driving amount of the focus lens 103 so as to obtain a highly reliable defocus amount, and also performs the search driving for driving the focus lens 103 via the focus lens driver 105. The search drive is a drive depending on the drive speed of the calculated focus lens 103. The search drive is for driving the drive velocity. The search drive determines the drive velocity depending on the focal length without using the calculated defocus amount to drive the focus detection processing and the focus lens control in parallel.

After the control states of the focus adjustment operation are respectively set at steps S411 to S414, the flow proceeds to step S415. At step S415, the camera controller 212 determines whether to end the focus adjustment operation according to the setting of the camera body 20, the input from the camera operation unit 213, and the control state of the focus adjustment operation. When it is determined that the focus adjustment operation is not ended, the flow returns to step S402. On the other hand, when it is determined that the focus adjustment operation is to be ended, the flow is ended. In this manner, the camera controller 212 sets appropriate detection property according to the control state of the AF operation, the AF mode, and the focus adjustment operation, and it performs the focus adjustment operation.

Figure 6:
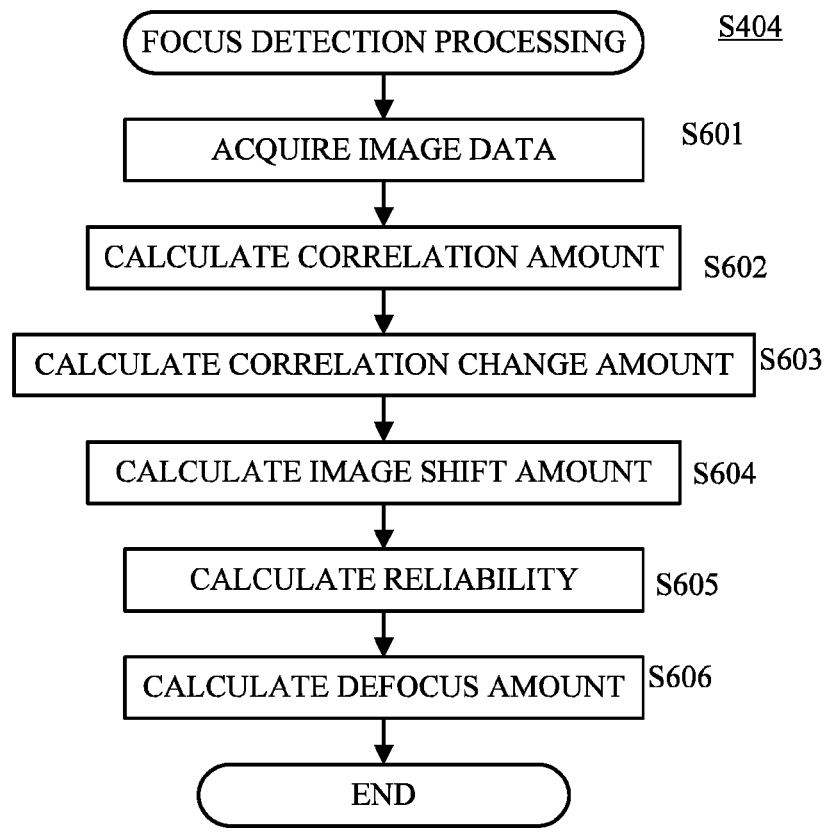
FIG. 6 is a flowchart of illustrating focus detection processing in each embodiment.

Next, referring to FIG. 6, the focus detection processing (step S404 in FIG. 4) performed by the AF signal processor 204 will be described in detail. FIG. 6 is a flowchart of illustrating the focus detection processing. Each step of FIG. 6 is mainly performed by the AF signal processor 204 based on a command from the camera controller 212.

Figure 7:
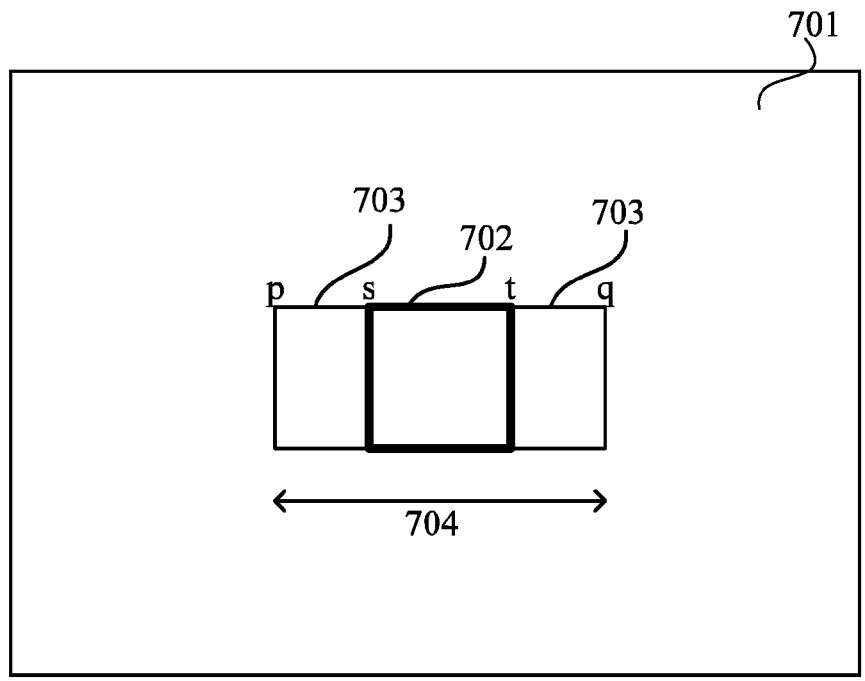
FIG. 7 is an explanatory diagram of a focus detection area in each embodiment.

First, at step S601, the AF signal processor 204 acquires the pair of image signals (image data) as AF signals from the plurality of pixels included in the focus detection area of the image sensor 201. FIG. 7 is an explanatory diagram of the focus detection area 702 on the pixel array 701 of the image sensor 201. Shift areas 703 on both sides of the focus detection area 702 are areas necessary for the correlation calculation. Therefore, an area 704 corresponding to a combination of the focus detection area 702 and the shift area 703 is a pixel area necessary for the correlation calculation. Symbols P, q, s, and t in FIG. 7 are coordinates in the horizontal direction (x axis direction), symbols p and q are the x coordinates of the start point and the end point of the area 704 (pixel area), respectively, and symbols s and t are the x coordinates of the start point and the end point of the focus detection area 702, respectively.

Figure 8A:
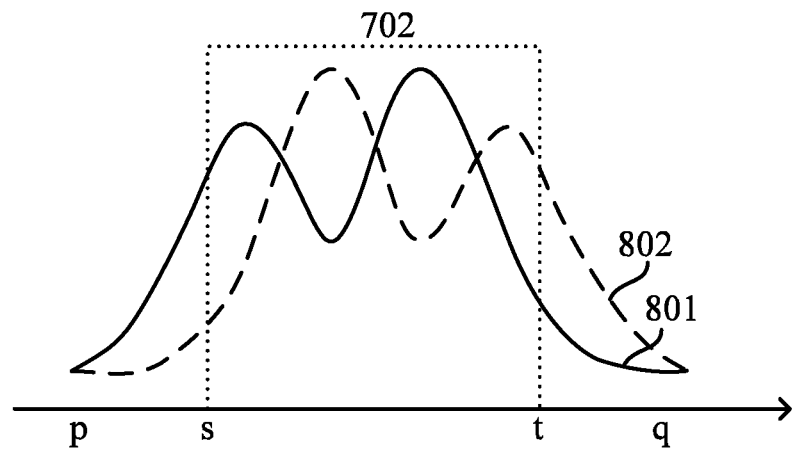
FIGS. 8A to 8C are explanatory diagrams of AF signals (a pair of image signals) in each embodiment.
Figure 8B:
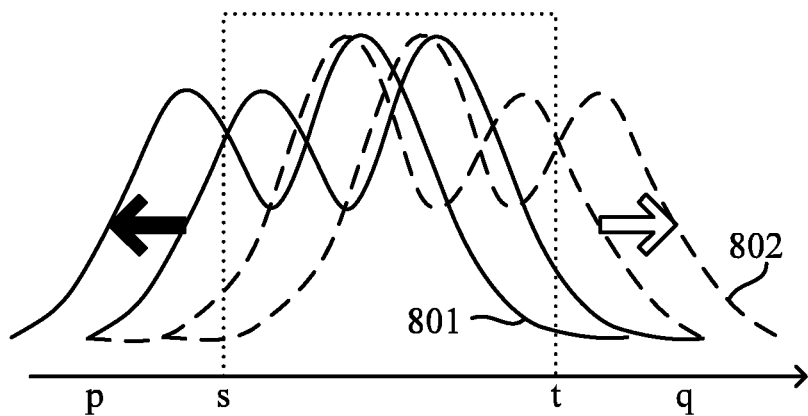
Figure 8C:
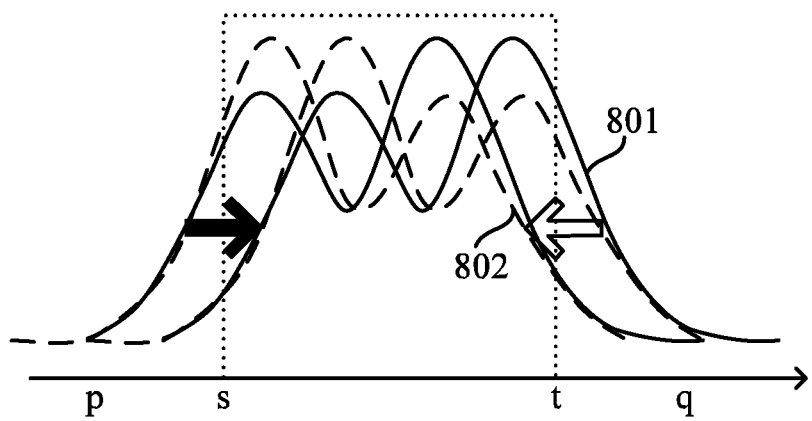

FIGS. 8A to 8C are explanatory diagrams of the AF signals (pair of image signals) acquired from the plurality of pixels included in the focus detection area 702 of FIG. 7. In FIG. 8, a solid line 801 is one (image signal A) of the pair of image signals, and a dashed line 802 is the other (image signal B) of the pair of image signals. FIG. 8A illustrates the image signal A and the image signal B before the shift, and FIGS. 8B and 8C illustrate the image signal A and the image signal B shifted from the state of FIG. 8A in a positive direction and a negative direction, respectively.

Subsequently, at step S602 of FIG. 6, the AF signal processor 204 calculates the correlation amount (correlation data) of the pair of image signals while relatively shifting the pair of image signals (image signal A and image signal B) acquired at step S601 by one pixel (one bit) at a time. With respect to each of plurality of pixel lines (scanning lines) provided in the focus detection area, as illustrated in FIGS. 8B and 8C, the AF signal processor 204 shifts both the image signal A (801) and the image signal B (802) by one bit at a time in an arrow direction. Further, the AF signal processor 204 calculates the correlation amount of the pair of image signals (image signal A (801) and the image signal B (802)) with respect to each of the plurality of scanning lines, and it adds and averages the correlation amounts of the plurality of scanning lines to calculate one correlation amount.

In this embodiment, when calculating the correlation amount, the pair of image signals are relatively shifted by one pixel at a time, but the present invention is not limited thereto. For example, the pair of image signals may be shifted by a larger number of pixels, for example, by relatively shifting the pair of image signals by two pixels. Further, in this embodiment, one correlation amount is calculated by adding and averaging the correlation amounts with respect to each of the plurality of scanning lines, but the present invention is not limited thereto. For example, it is possible to add and average the pair of image signals with respect to each of the plurality of scanning lines, and then calculate the correlation amount with respect to the added and averaged pair of image signals.

The correlation amount COR[i] can be calculated by using expression (1) below.

$$COR[i] = \sum_{k=x}^{y} |A[k+i] - B[k-i]| \quad (1)$$

$$\{(p-s) < i < (q-t)\}$$

In expression (1), symbol i is a shift amount, symbol p−s is a maximum shift amount in the minus direction, symbol q−t is a maximum shift amount in the plus direction, symbol x is a start coordinate of the focus detection area 702, and symbol y is an end coordinate.

Figure 9A:
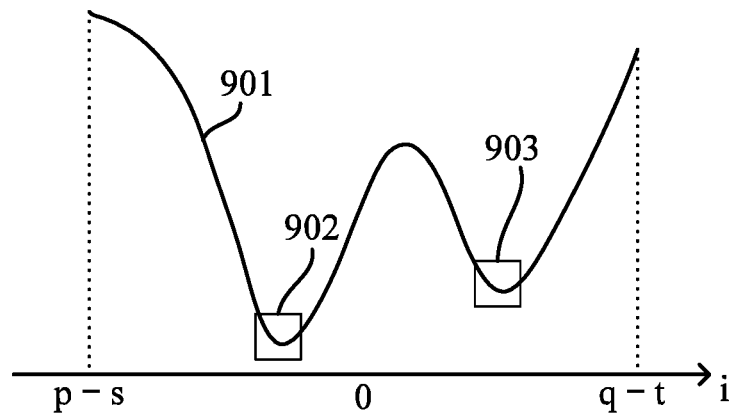
FIGS. 9A and 9B are explanatory diagrams of a relationship between a shift amount of the AF signal and a correlation amount in each embodiment.
Figure 9B:
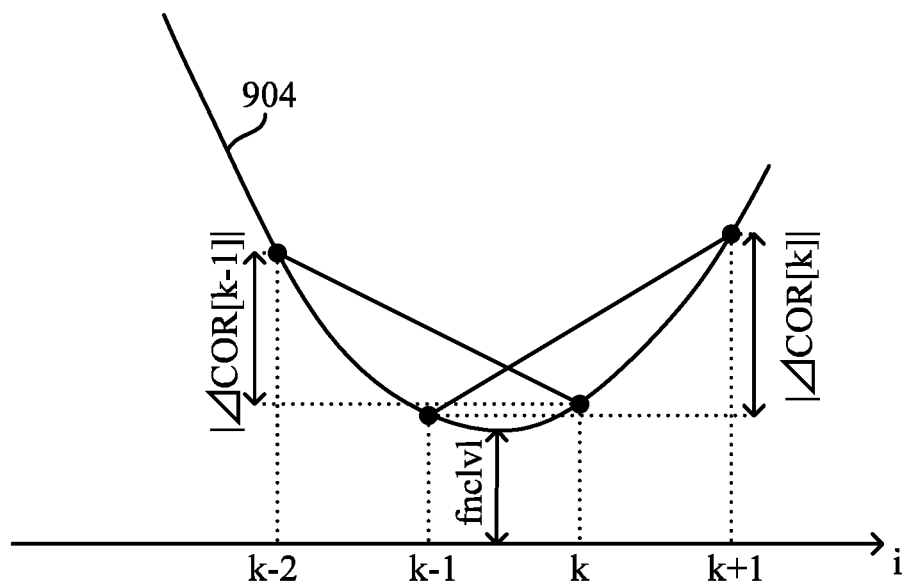

Referring to FIGS. 9A and 9B, the relationship between the shift amount and the correlation amount COR will be described. FIGS. 9A and 9B are explanatory diagrams of the relationship between the shift amount and the correlation amount COR. FIG. 9B is an enlarged view of a region 902 of FIG. 9A. In FIG. 9A, the horizontal axis represents the shift amount and the vertical axis represents the correlation amount COR. The degree of coincidence of the pair of image signals (image signal A and image signal B) is maximized in the shift amount corresponding to the smaller correlation amount of the regions 902 and 903 near the extreme value in the correlation amount 901 that changes with the shift amount.

Subsequently, at step S603 of FIG. 6, the AF signal processor 204 calculates the correlation change amount based on the correlation amount calculated at step S602. In this embodiment, a difference in correlation amount at every other shift in the waveform of the correlation amount 901 illustrated in FIG. 9A is calculated as the correlation change amount. The correlation change amount ΔCOR[i] can be calculated by using expression (2) below.

$$\Delta COR[i]=COR[i-1]-COR[i+1]$$

$$\{(p-s+1)<i<(q-t-1)\} \quad (2)$$

Figure 10A:
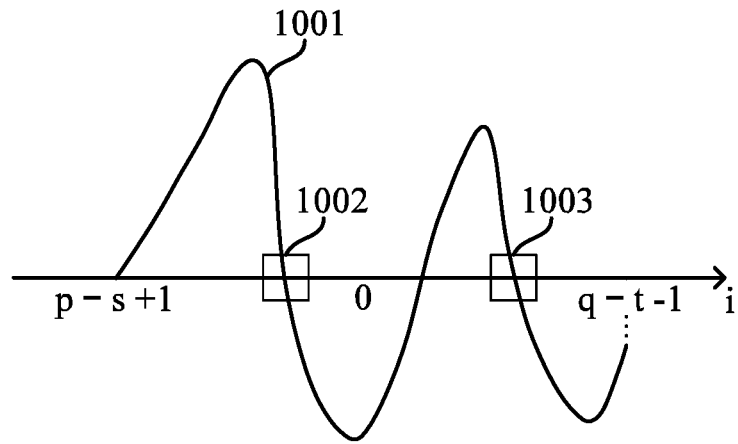
FIGS. 10A and 10B are explanatory diagrams of a relationship between the shift amount of the AF signal and a correlation change amount in each embodiment.
Figure 10B:
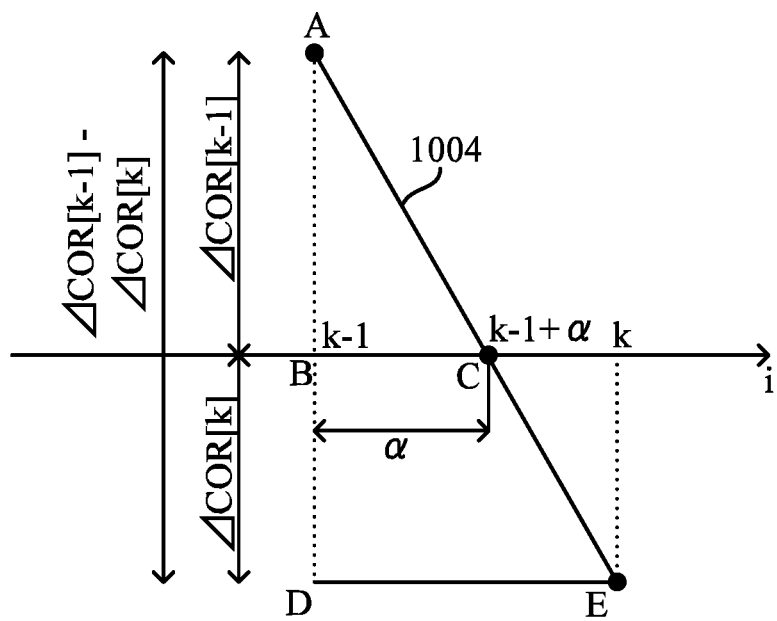

Subsequently, at step S604, the AF signal processor 204 calculates the image shift amount by using the correlation change amount calculated at step S603. Referring to FIGS. 10A and 10B, the relationship between the shift amount and the correlation change amount ΔCOR will be described. FIGS. 10A and 10B are explanatory diagrams of the relationship between the shift amount and the correlation change amount ΔCOR. FIG. 10B is an enlarged view of a region 1002 of FIG. 10A. In FIG. 10A, the horizontal axis represents the shift amount and the vertical axis represents the correlation change amount ΔCOR. A correlation change amount 1001 that changes with the shift amount becomes positive to negative in the regions 1002 and 1003. The state in which the correlation change amount is 0 is called zero cross, and the degree of coincidence between the pair of image signals (image signal A and image signal B) is maximized. Therefore, the shift amount giving the zero cross is the image shift amount.

In FIG. 10B, reference numeral 1004 is a part of the correlation change amount 1001. The shift amount (k−1+α) giving the zero cross is divided into an integer part β (=k−1) and a decimal part α. The decimal part α can be calculated from the similarity relationship between the triangle ABC and the triangle ADE in FIG. 10B by using expression (3) below.

$$AB:AD = BC:DE \quad (3)$$

$$\Delta COR[k-1]:\Delta COR[k-1] - \Delta COR[k] = \alpha:k - (k-1)$$

$$\alpha = \frac{\Delta COR[k-1]}{\Delta COR[k-1] - \Delta COR[k]}$$

The integer part β can be calculated using expression (4) below from FIG. 10B.

$$\beta = k-1 \quad (4)$$

That is, the image shift amount PRD can be calculated from the sum of a fraction part α and an integer part β. As illustrated in FIG. 10A, when there are a plurality of zero crosses of the correlation change amount ΔCOR, the one having a greater steepness of the change in the correlation change amount ΔCOR in the vicinity thereof is taken as a first zero cross. This steepness is an index indicating the easiness of performing the AF, it indicates that it is easier to perform highly accurate AF as the value of the index is larger. The steepness maxder can be calculated by using expression (5) below.

$$\max der = |\Delta COR[k-1+]| + |\Delta COR[k]| \quad (5)$$

In this embodiment, when there are a plurality of zero cross of the correlation change amount, the first zero cross is determined based on the steepness thereof, and the shift amount giving the first zero cross is taken as the image shift amount.

Subsequently, at step S605 of FIG. 6, the AF signal processor 204 calculates the reliability (correlation reliability) representing the degree of the reliability of the image shift amount calculated at step S604. The reliability of the image shift amount can be defined by the degree of coincidence (degree of coincidence of two images) fnclvl of the pair of image signals (image signal A and image signal B) and the steepness of the correlation change amount ΔCOR. The degree of coincidence of the two images is an index representing the accuracy of the image shift amount, and the smaller the value is, the higher the accuracy is. In FIG. 9B, reference numeral 904 is a part of the correlation amount 901. The degree of coincidence fnclvl of two images can be calculated by using expression (6) below.

(i) When $|\Delta COR[k-1]| \times 2 \leq \max der,$ $fnclvl = COR[k-1] + \Delta COR[k-1]/4$ (ii) When $|\Delta COR[k-1]| \times 2 \geq \max der,$ $$fnclvl = COR[k] - \Delta COR[k]/4 \quad (6)$$

Finally, at step S606 of FIG. 6, the AF signal processor 204 calculates the defocus amount with respect to the target focus detection area by using the image shift amount calculated at step S604, and then the flow (focus detection processing) is finished.

According to this embodiment, depending on the combination of the AF operation, the control state of the focus adjustment operation, and the AF mode, the detection property such as the number of focus detection areas to be calculated simultaneously and the evaluation band of the AF signal can be appropriately set. Therefore, according to this embodiment, it is possible to stably realize a high-speed and high-accuracy focus adjustment operation.

Second Embodiment

Next, a second embodiment of the present invention will be described. This embodiment is different from the first embodiment in the setting of the detection property (step S403 in FIG. 4). That is, the camera controller 212 sets a plurality of focus detection areas, and as the type of the focus adjustment operation, it changes the detection property depending on the type of the focus detection area as a target of setting of the detection property (i.e., whether the focus detection area is the main area). Since other configurations and operations are the same as those of the first embodiment, description thereof will be omitted.

Figure 11:
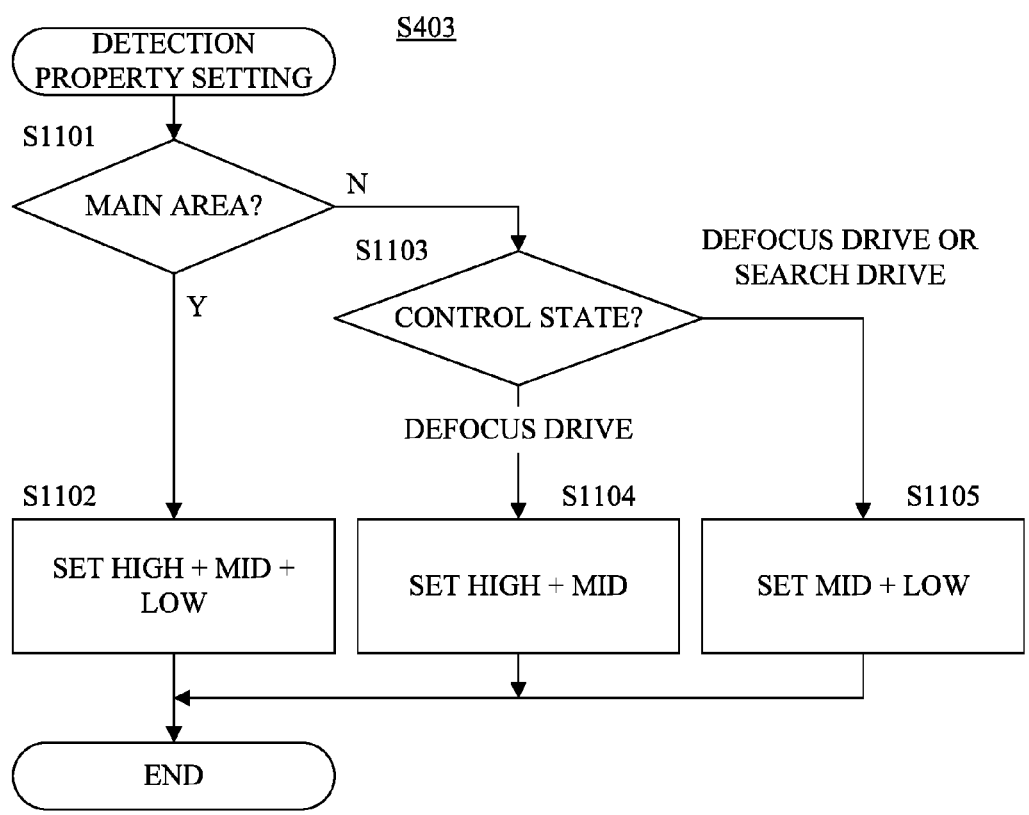
FIG. 11 is a flowchart of illustrating setting of detection property in a second embodiment.

FIG. 11 is a flowchart of illustrating setting of the detection property (step S403) in this embodiment. Each step of FIG. 11 is mainly performed by the camera controller 212.

First, at step S1101, the camera controller 212 determines whether the focus detection area as a target of setting the detection property is the main area (i.e., main focus detection area) determined at step S405 of FIG. 4. When it is determined at step S1101 that the focus detection area is the main area, the flow proceeds to step S1102. At step S1102, the camera controller 212 sets the detection property of a high frequency band, a middle frequency band, and a low frequency band (high frequency band "HIGH"+middle frequency band "MID"+low frequency band "LOW"). The high frequency band, the middle frequency band, and the low frequency band are evaluation bands of an AF signal (signal waveform) used for the correlation calculation, as described referring to FIG. 2.

On the other hand, when it is determined at step S1101 that the focus detection area is not the main area, the flow proceeds to step S1103. At step S1103, the camera controller 212 determines a control state of the focus lens 103 (i.e., control state of the focus adjustment operation, or drive mode). When it is determined at step S1103 that the control state (drive mode) is the target drive, the flow proceeds to step S1104. At step S1104, the camera controller 212 sets the detection property of the high frequency band and the middle frequency band (high frequency band+middle frequency band). On the other hand, when it is determined at step S1103 that the control state is the defocus drive or the search drive, the flow proceeds to step S1105. At step S1105, the camera controller 212 sets the detection property of the middle frequency band and the low frequency band (middle frequency band+low frequency band).

When a plurality of focus detection areas are set and the focus detection is to be performed using all detection properties (i.e., AF signals in the high frequency band+the middle frequency band+the low frequency band) for all the focus detection areas, it is difficult to perform the correlation calculation on all the evaluation bands within a predetermined processing time. On the other hand, when the focus detection is performed using the AF signals in the high frequency band+the middle frequency band or the middle frequency band+the low frequency band in order to complete the correlation calculation in the predetermined processing time, the focus detection accuracy is lowered or it may take time for the focus adjustment operation. In particular, however, by setting the detection property (i.e., the evaluation band of the AF signal) to be set in the main area directly influenced on the control of the focus adjustment operation, as in this embodiment, to the high frequency band+the middle frequency band+the low frequency band, it is possible to stably realize a high-speed and high-accuracy focus adjustment operation.

According to this embodiment, it is possible to appropriately set the detection property of the AF signal depending on whether the target focus detection area is the main area. Therefore, according to this embodiment, it is possible to stably realize the high-speed and high-precision focusing operation.

Third Embodiment

Next, a third embodiment of the present invention will be described. This embodiment is different from the first embodiment in that a second defocus threshold value is set (changed) depending on at least one of an image capturing condition and a state of an AF image signal.

Figure 12:
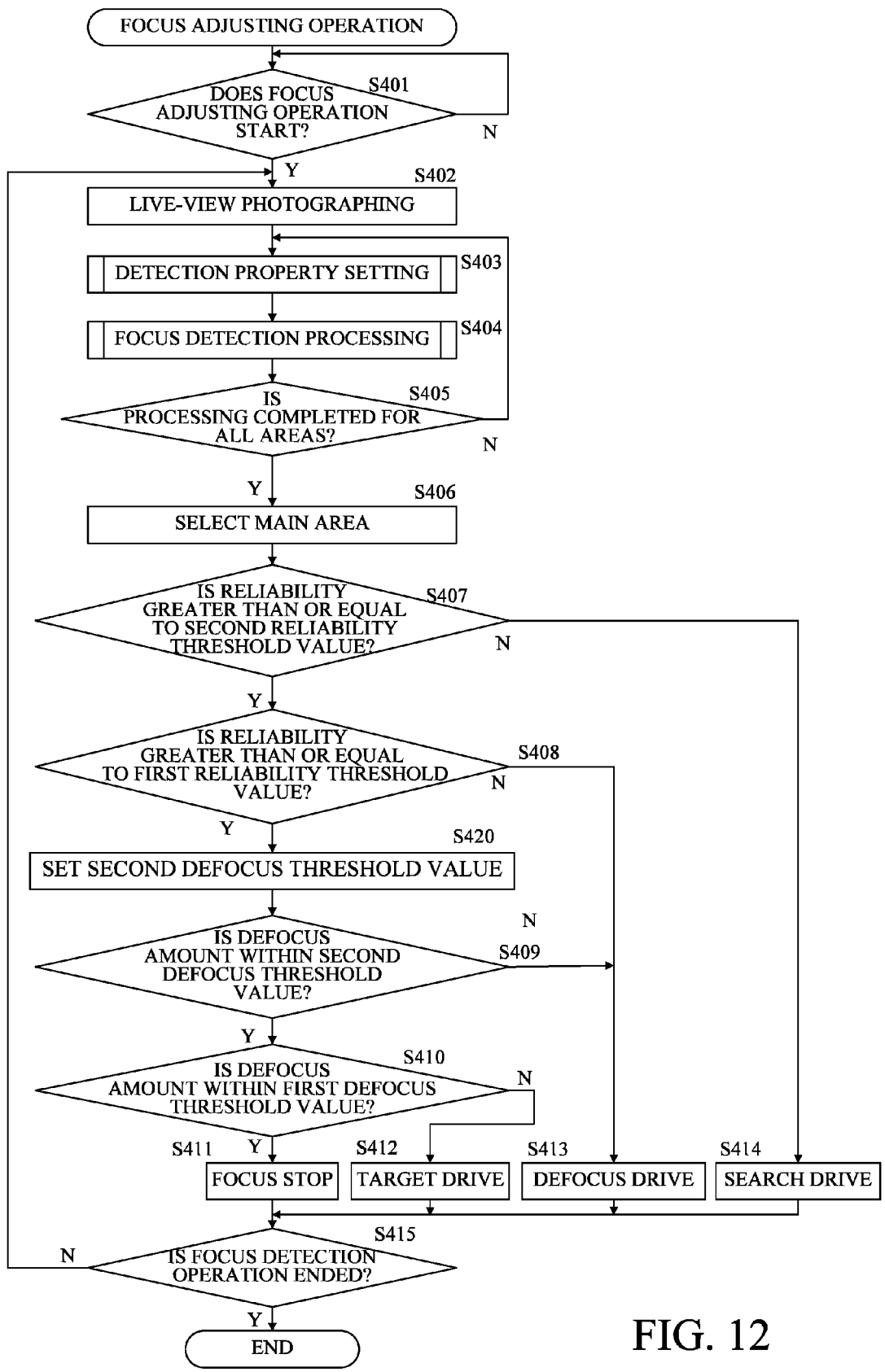
FIG. 12 is a flowchart of illustrating a focus adjustment operation in a third embodiment.

Referring to FIG. 12, the focus adjustment operation (focus control) in this embodiment will be described. FIG. 12 is a flowchart of illustrating a procedure of the focus adjustment operation in this embodiment. FIG. 12 differs from FIG. 4 only in that step S420 is inserted between step S408 and step S409 in FIG. 4, and accordingly the descriptions of steps other than step S420 are omitted.

When it is determined at step S408 that the reliability is equal to or higher than a first reliability threshold value, the flow proceeds to step S420. At step S420, the AF control unit 2122 sets a second defocus threshold. Commonly, the second defocus threshold value is determined based on the calculated defocus amount, and it is preferred that a maximum value is set within a defocus range where the defocus amount is detectable even when the evaluation band described above is switched to a high frequency band where the detection range of the defocus amount is narrow. However, as one of the purposes in this embodiment, by appropriately setting a value depending on an image capturing condition or a state of the AF image signal, the target drive (step S412) and the defocus drive (step S413) are effectively switched to achieve both the accuracy and the speed of the AF operation. In this embodiment, it is preferred that only image capturing conditions where an image plane moving amount up to the in-focus state is large are targeted depending on the state of the focal length and the aperture stop (aperture stop diameter). When the state of the AF image signal such as the degree of coincidence of two images, the steepness of an image shift amount, and the signal levels of the two images is satisfactory, the second defocus threshold value is set to be larger than common image capturing conditions. The image capturing condition as a target may be added as necessary, such as a brightness and a hand-shake state.

In this embodiment, an appropriate second defocus threshold value is set depending in the image capturing condition or the state of the AF image signal. Thus, it is possible to effectively switch between the target drive (step S412) and the defocus drive (step S413) to achieve both the accuracy and the speed of the AF operation.

Figure 13A:
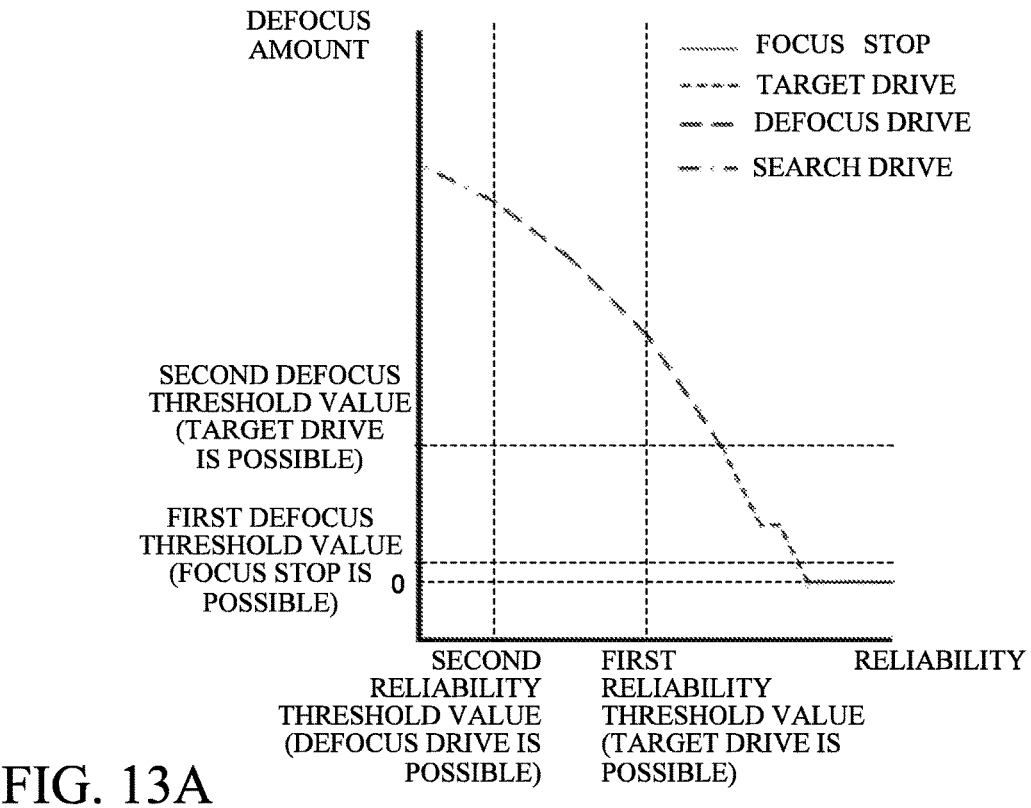
FIGS. 13A and 13B are explanatory diagrams of a relationship between a reliability and a detected defocus amount in a third embodiment.
Figure 13B:
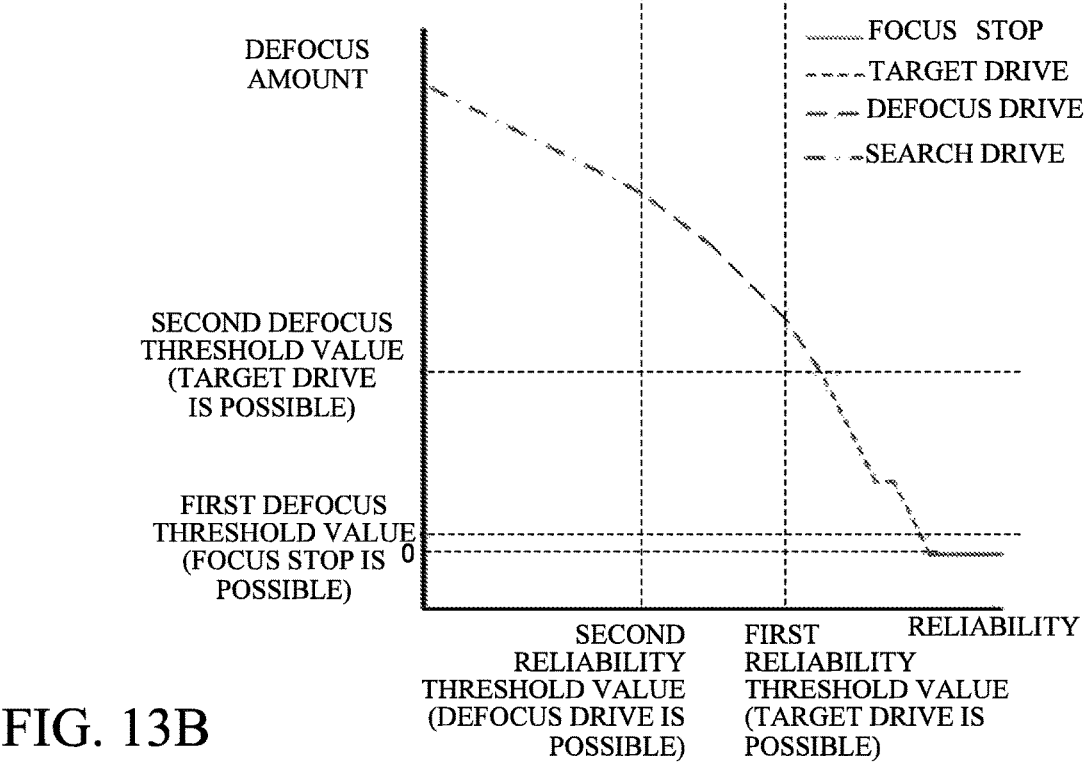

FIGS. 13A and 13B are explanatory diagrams of the relationship between the reliability and the detected defocus amount in the focus adjustment operation described referring to FIG. 12. FIG. 13A illustrates a case where the image plane moving amount (image plane moving amount in a predetermined condition) is common, and FIG. 13B illustrates a case where the image plane moving amount is large. In each of FIGS. 13A and 13B, a horizontal axis represents the reliability whose value increases as the focus state approaches the in-focus state to increase the reliability. A vertical axis represents the detected defocus amount whose value decreases as the focus state approaches the in-focus state to decrease the detected defocus amount.

As described above, the drive state of the focus lens 103 is determined depending on the reliability and the detected defocus amount. Commonly, state transitions are performed from the greatly blurred upper left state in the order of the search drive (step S414), the defocus drive (step S413), and the target drive (step S412), and finally the focusing is stopped (step S411) in the in-focus lower right state. In this embodiment, as described at step S420, the second defocus threshold value increases when the image plane moving amount up to the in-focus state is large depending on the focal length, the state of the aperture stop, and the like. This makes it possible to relax the moving condition from the defocus drive (step S413) to the target drive (step S412), thereby shortening the focusing time.

As described above, the control apparatus includes the calculator (AF signal processor 204) and the focus adjuster (camera controller 212). The calculator calculates a defocus amount based on the first signal (i.e., signal corresponding to the image signal A) and the second signal (i.e., signal corresponding to the image signal B) that correspond to light beams passing through different pupil regions of an image capturing optical system from each other (i.e., output signals from the image sensor 201). The focus adjuster performs a focus adjusting operation (i.e., focus control) based on the defocus amount. Furthermore, the focus adjuster changes the detection property (detection characteristics) of the first signal and the second signal by the calculator depending on the type of the focus adjusting operation.

Preferably, the detection property include the property related to the frequency bands (i.e., evaluation bands) of the first signal and the second signal that is used to calculate the defocus amount by the calculator. The change of the evaluation band can be achieved by changing the filter (i.e., filter band such as high frequency band, middle frequency band, and low frequency band) in the calculator that is applied to the first signal and the second signal. More preferably, the focus adjuster selectively sets, as the type of the focus adjusting operation, one drive mode from the plurality of drive modes (i.e., the plurality of control states illustrated in FIG. 5) for the focus adjusting operation. The plurality of drive modes include the first drive mode (i.e., target drive) and the second drive mode (i.e., defocus drive or search drive). The first drive mode is a drive mode where the focus adjusting operation is performed by using the first signal and the second signal that are acquired while the focus lens of the image capturing optical system is stopped. The second drive mode is a drive mode where the focus adjusting operation is performed by using the first signal and the second signal that are acquired while the focus lens is driven. The focus adjuster changes the detection property depending on the drive mode. More preferably, the focus adjuster selects the one drive mode from the plurality of drive modes depending on the defocus amount (steps S409 to S414). Preferably, the calculator calculates the reliability related to the first signal and the second signal, and the focus adjuster selects the one drive mode from the plurality of drive modes depending on the reliability (steps S407, S408, and S411 to S414). More preferably, the calculator calculates the reliability based on the degree of coincidence of the first signal and the second signal and the steepness of the correlation change amount of the first signal and the second signal.

Preferably, the focus adjuster sets, as the frequency band, the first frequency band (high frequency+middle frequency) in the first drive mode to be higher than the second frequency band (middle frequency+low frequency) in the second drive mode. Preferably, the detection property includes the number of focus detection areas where the first signal and the second signal are detected (FIG. 5). More preferably, the focus adjuster sets the number of the focus detection areas in the first drive mode to be smaller than the number of the focus detection areas in the second drive mode (FIG. 5).

Preferably, the focus adjuster sets the plurality of focus detection areas for detecting the first signal and the second signal. Then, the focus adjuster changes the detection property depending on the type of the focus detection area as a target of setting the detection property in the plurality of focus detection areas, that is, depending on whether the focus detection area is the main area (steps S1101 to S1105). More preferably, the focus adjuster determines the main area from the plurality of focus detection areas, and changes the detection property in the main area from the detection property in another area (steps S1101 to S1105). More preferably, the frequency band as the detection property related to the main area is wider than a frequency band related to another area (steps S1102, S1104, and S1105).

Preferably, the focus adjuster changes the threshold value of the defocus amount (i.e., the second defocus threshold value) for selecting the one drive mode (i.e., defocus drive) from the plurality of drive modes based on the state of the image capturing optical system. More preferably, the image capturing optical system has the first image capturing state (FIG. 13A) and the second image capturing state (FIG. 13B) where the image plane moving amount in the predetermined condition is larger than the image plane moving amount in the first image capturing state. The focus adjuster increases the threshold value of the defocus amount (i.e., the second defocus threshold value) in the second image capturing state compared to the threshold value of the defocus amount in the first image capturing state. More preferably, the focal length in the second image capturing state is longer than the focal length in the first image capturing state. More preferably, the aperture stop diameter in the second image capturing state is smaller than the aperture stop diameter in the first image capturing state.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to each embodiment, it is possible to provide a control apparatus, an image capturing apparatus, a control method, and a non-transitory computer-readable storage medium that can stably perform high-speed and high-accuracy focus adjustment.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-157102, filed on Aug. 10, 2016, and No. 2017-116352, filed on Jun. 14, 2017, which are hereby incorporated by reference herein in their entirety.

What is claimed is:

1. A control apparatus comprising:
    a calculator configured to calculate a defocus amount based on a first signal and a second signal that correspond to light beams passing through different pupil regions of an image capturing optical system from each other; and
    a focus adjuster configured to perform a focus adjusting operation based on the defocus amount,
    wherein the focus adjuster is configured to change a detection property of the first signal and the second signal, depending on a type of the focus adjusting operation,
    wherein the detection property includes a property related to frequency bands of the first signal and the second signal that is used to calculate the defocus amount by the calculator,
    wherein the focus adjuster is configured to selectively set, as the type of the focus adjusting operation, one drive mode from a plurality of drive modes for the focus adjusting operation,
    wherein the plurality of drive modes includes:
        a first drive mode where the focus adjusting operation is performed by using the first signal and the second signal that are acquired while a focus lens of the image capturing optical system is stopped, and
        a second drive mode where the focus adjusting operation is performed by using the first signal and the second signal that are acquired while the focus lens is driven,
    wherein the focus adjuster is configured to change a threshold value of the defocus amount for selecting the one drive mode from the plurality of drive modes based on a state of the image capturing optical system,
    wherein the image capturing optical system has a first image capturing state and a second image capturing state where an image plane moving amount in a predetermined condition is larger than the image plane moving amount in the first image capturing state, and
    wherein the focus adjuster is configured to increase the threshold value of the defocus amount in the second image capturing state compared to the threshold value of the defocus amount in the first image capturing state.

2. The control apparatus according to claim 1, wherein the focus adjuster is configured to set, as the frequency band, a first frequency band in the first drive mode to be higher than a second frequency band in the second drive mode.

3. The control apparatus according to claim 1, wherein the detection property includes the number of focus detection areas where the first signal and the second signal are detected.

4. The control apparatus according to claim 3, wherein the focus adjuster is configured to set the number of the focus detection areas in the first drive mode to be smaller than the number of the focus detection areas in the second drive mode.

5. An image capturing apparatus comprising:
    an image sensor including a first photoelectric converter and a second photoelectric converter configured to receive light beams passing through different pupil regions of an image capturing optical system from each other;
    a calculator configured to calculate a defocus amount based on a first signal and a second signal that correspond to output signals from the first photoelectric converter and the second photoelectric converter, respectively, and a focus adjuster configured to perform a focus adjusting operation based on the defocus amount, wherein the focus adjuster is configured to change a detection property of the first signal and the second signal by the calculator, depending on a type of the focus adjusting operation, wherein the detection property includes a property related to frequency bands of the first signal and the second signal that is used to calculate the defocus amount by the calculator, wherein the focus adjuster is configured to selectively set, as the type of the focus adjusting operation, one drive mode from a plurality of drive modes for the focus adjusting operation, wherein the plurality of drive modes includes:
  a first drive mode where the focus adjusting operation is performed by using the first signal and the second signal that are acquired while a focus lens of the image capturing optical system is stopped, and
  a second drive mode where the focus adjusting operation is performed by using the first signal and the second signal that are acquired while the focus lens is driven, wherein the focus adjuster is configured to change a threshold value of the defocus amount for selecting the one drive mode from the plurality of drive modes based on a state of the image capturing optical system, wherein the image capturing optical system has a first image capturing state and a second image capturing state where an image plane moving amount in a predetermined condition is larger than the image plane moving amount in the first image capturing state, and wherein the focus adjuster is configured to increase the threshold value of the defocus amount in the second image capturing state compared to the threshold value of the defocus amount in the first image capturing state.

6. The image capturing apparatus according to claim 5, wherein the image sensor includes the first photoelectric converter and the second photoelectric converter with respect to each of a plurality of microlenses, and the plurality of microlenses are arrayed in two dimensions.

7. The control apparatus according to claim 1, wherein a focal length in the second image capturing state is longer than the focal length in the first image capturing state.

8. The control apparatus according to claim 1, wherein an aperture stop diameter in the second image capturing state is smaller than the aperture stop diameter in the first image capturing state.

9. A control method comprising the steps of:
calculating a defocus amount based on a first signal and a second signal that correspond to light beams passing through different pupil regions of an image capturing optical system from each other; and
performing a focus adjusting operation based on the defocus amount,
wherein the step of performing the focus adjusting operation includes changing a detection property of the first signal and the second signal used in the step of calculating the defocus amount, depending on a type of the focus adjusting operation,
wherein the detection property includes a property related to frequency bands of the first signal and the second signal that is used to calculate the defocus amount,
wherein the step of performing the focus adjusting operation selectively sets, as the type of the focus adjusting operation, one drive mode from a plurality of drive modes for the focus adjusting operation,
wherein the plurality of drive modes includes:
  a first drive mode where the focus adjusting operation is performed by using the first signal and the second signal that are acquired while a focus lens of the image capturing optical system is stopped, and
  a second drive mode where the focus adjusting operation is performed by using the first signal and the second signal that are acquired while the focus lens is driven,
wherein the step of performing the focus adjusting operation changes a threshold value of the defocus amount for selecting the one drive mode from the plurality of drive modes based on a state of the image capturing optical system,
wherein the image capturing optical system has a first image capturing state and a second image capturing state where an image plane moving amount in a predetermined condition is larger than the image plane moving amount in the first image capturing state, and
wherein the step of performing the focus adjusting operation increases the threshold value of the defocus amount in the second image capturing state compared to the threshold value of the defocus amount in the first image capturing state.

10. A non-transitory computer-readable storage medium storing a program which causes a computer to execute a process comprising the steps of:
calculating a defocus amount based on a first signal and a second signal that correspond to light beams passing through different pupil regions of an image capturing optical system from each other; and
performing a focus adjusting operation based on the defocus amount,
wherein the step of performing the focus adjusting operation includes changing a detection property of the first signal and the second signal used in the step of calculating the defocus amount, depending on a type of the focus adjusting operation,
wherein the detection property includes a property related to frequency bands of the first signal and the second signal that is used to calculate the defocus amount,
wherein the step of performing the focus adjusting operation selectively sets, as the type of the focus adjusting operation, one drive mode from a plurality of drive modes for the focus adjusting operation,
wherein the plurality of drive modes includes:
  a first drive mode where the focus adjusting operation is performed by using the first signal and the second signal that are acquired while a focus lens of the image capturing optical system is stopped, and
  a second drive mode where the focus adjusting operation is performed by using the first signal and the second signal that are acquired while the focus lens is driven,
wherein the step of performing the focus adjusting operation changes a threshold value of the defocus amount for selecting the one drive mode from the plurality of drive modes based on a state of the image capturing optical system,
wherein the image capturing optical system has a first image capturing state and a second image capturing state where an image plane moving amount in a predetermined condition is larger than the image plane moving amount in the first image capturing state, and wherein the step of performing the focus adjusting operation increases the threshold value of the defocus amount in the second image capturing state compared to the threshold value of the defocus amount in the first image capturing state.

11. A control apparatus comprising:

a calculator configured to calculate a defocus amount based on a first signal and a second signal that correspond to light beams passing through different pupil regions of an image capturing optical system from each other; and a focus adjuster configured to perform a focus adjusting operation based on the defocus amount, wherein the focus adjuster is configured to change a detection property of the first signal and the second signal, depending on a type of the focus adjusting operation, wherein the detection property includes a property related to frequency bands of the first signal and the second signal that is used to calculate the defocus amount by the calculator, wherein the calculator is configured to calculate the reliability based on a degree of coincidence of the first signal and the second signal and a steepness of a correlation change amount of the first signal and the second signal, wherein the focus adjuster is configured to selectively set, as the type of the focus adjusting operation, one drive mode from a plurality of drive modes for the focus adjusting operation depending on the reliability, and wherein the plurality of drive modes includes:

a first drive mode where the focus adjusting operation is performed by using the first signal and the second signal that are acquired while a focus lens of the image capturing optical system is stopped, and a second drive mode where the focus adjusting operation is performed by using the first signal and the second signal that are acquired while the focus lens is driven.

* * * * *